United States Patent [19]

Komurasaki et al.

[11] 4,384,561
[45] May 24, 1983

[54] IGNITION TIMING CORRECTING SYSTEM FOR INTERNAL COMBUSTION ENGINE

[75] Inventors: Satoshi Komurasaki; Atsushi Ueda, both of Himeji, Japan

[73] Assignee: Mitsubishi Denki Kabushiki Kaisha, Tokyo, Japan

[21] Appl. No.: 242,904

[22] Filed: Mar. 12, 1981

[30] Foreign Application Priority Data

Mar. 18, 1980 [JP] Japan .................. 55-35926

[51] Int. Cl.³ .......................... F02P 5/04; F02P 5/14
[52] U.S. Cl. .................................... 123/416; 123/414
[58] Field of Search .............. 123/414, 416, 415, 427, 123/146.5 A

[56] References Cited

U.S. PATENT DOCUMENTS

| | | | |
|---|---|---|---|
| 4,000,724 | 1/1977 | Fowler | 123/416 |
| 4,077,372 | 3/1978 | Masta | 123/416 |
| 4,250,846 | 2/1981 | Menard | 123/416 |
| 4,284,046 | 8/1981 | Hashimoto et al. | 123/416 |
| 4,292,941 | 10/1981 | Suzuki | 123/414 |
| 4,304,203 | 12/1981 | Gascea et al. | 123/416 |
| 4,320,729 | 3/1982 | Sawada et al. | 123/425 |
| 4,324,217 | 4/1982 | Inn et al. | 123/414 |
| 4,327,687 | 5/1982 | Naubner et al. | 123/414 |

Primary Examiner—Raymond A. Nelli
Attorney, Agent, or Firm—Wenderoth, Lind & Ponack

[57] ABSTRACT

An ignition timing correcting system generates a reference timing signal at a reference angular position of a rotating internal combustion engine and a ignition timing signal leading it by a constant phase. The latter signal is controllably retarded in phase to form a retarded ignition timing signal. The phase comparison of the two signals produces an advance or a retardation correcting signal formed of a pulse train having a pulse width corresponding to the phase difference between them. During the idling of the engine, the correcting signal drives a reversible motor forwardly or reversely to move a movable top on a potentiometer to adjust a control signal provided from the latter. When the pulse width becomes sufficiently narrow, the correcting signal is disabled to drive the motor resulting in the required control signal. That control signal corrects the retardation of the retarded ignition timing signal to a regular ignition timing.

3 Claims, 8 Drawing Figures

IGNITION TIMING CORRECTING SYSTEM FOR INTERNAL COMBUSTION ENGINE

BACKGROUND OF THE INVENTION

The present invention relates to a system for correcting a shift of an ignition timing occurring in an ignition device used with internal combustion engines.

In recent years ignition devices used with motor vehicles have required increased output energy and improved accuracy and stability of the ignition timing in view of the purification of the exhaust gases from motor vehicles. Under these circumstances, ignition devices of the conventional contact breaker type are increasingly replaced by those of the fully transistorized type without contact breakers.

In this fully transistorized type of ignition device, the ignition timing signal is provided by a contactless signal generator such as an electromagnetic coil generator, an integrated circuit Hall generator or the like; such a generator is disposed within a mating distributor which is, in turn, usually driven by a crankshaft connected to an associated internal combustion engine through a timing belt or the like. Even in fully transistorized ignition devices, therefore, a shift of the ignition timing due to an ageing in the distributor driving system is increased with time. This shift of the ignition timing appears as a shift of the ignition timing developed during the idling of the engine and has greatly affected the output from the engines and the ingredients of the exhausted gases from the engines.

Therefore, the shift of the ignition timing is undesirable in view of measures to counter the exhaust gas emissions from internal combustion engines. Thus, it is desirable to correct a shift of the ignition timing of internal combustion engines by some measure.

Accordingly, it is an object of the present invention to provide a new and improved system for correcting a shift of an ignition timing of an internal combustion engine which system eliminates the necessity of recorrecting the shift of the ignition timing each time the internal combustion engine is started.

It is another object of the present invention to provide a new and improved system for correcting a shift of ignition timing of an interval combustion engine, said system haing an extremely simple construction.

SUMMARY OF THE INVENTION

The present invention provides an ignition timing correcting system for an interval combustion engine comprising a reference generator for generating a pulsed reference signal at a reference angular position of the rotation of an internal combustion engine, and an ignition generator for generating a pulsed ignition timing signal at an angular position of the rotation of the engine leading that of the pulsed reference signal, the pulsed ignition timing signal having the advance characteristic corresponding to the rotational speed of the engine. A phase shifter is connected to the ignition generator to retard the pulsed ignition timing signal in response to a control signal applied thereto to produce a pulsed retarded ignition timing signal, and an ignition circuit is connected to the phase shifter to generate a pulsed ignition voltage in response to the pulsed retarded ignition timing signal. A phase difference sensor senses a phase difference between the pulsed reference and retarded ignition timing signals to produce an advance or a retardation correcting signal in the form of a pulse train having a pulse width corresponding to the sensed phase difference as the case may be. The advance or retardation correcting signal is applied to a reversible electric motor only during the idling of the engine to drive the reversible motor in either the forward or reverse direction. Then, the reversible motor changes an output resistance of a variable resistor to control the control signal provided by the variable resistor. When the phase difference between the reference and retarded ignition timing signals decreases to a predetermined magnitude or less, the advance or retardation correcting signal is prevented from being applied to the reversible motor, whereby the variable resistor continues to provide the control signal whose magnitude is provided at that time.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENTS

Figure 1:
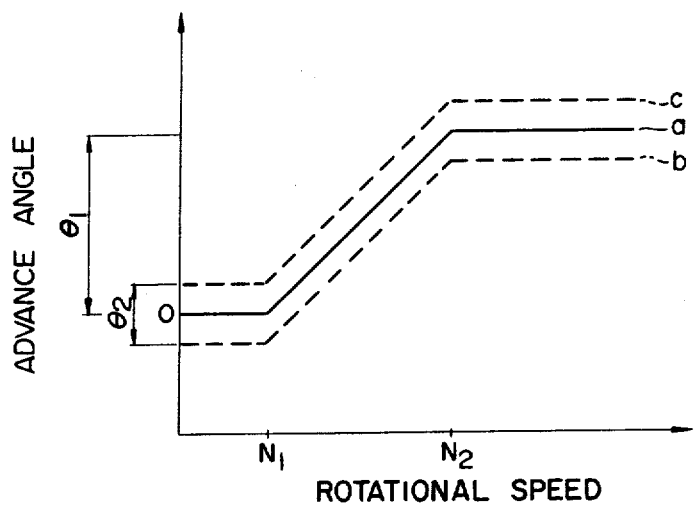
FIG. 1 is a graph illustrating the centrifugal advance characteristic of the ignition time previously developed in interval combustion engines.

For a better understanding of the nature of the present invention, a shift of an ignition time will now be described in conjunction with FIG. 1 wherein there is illustrated the centrifugal advance characteristic of the ignition time. In FIG. 1, the axis of the ordinate represents an advance angle $\theta$ of an ignition time and the axis of the abscissas represents the rotational speed of an internal combustion engine. Solid line a designates the regular advance characteristic of the ignition timing and dotted lines b and c located below and above the solid line a respectively designate the advance characteristics of the ignition timing shifted respectively to the retarding and advancing sides due to the ageing in an associated system for driving the distributor.

In the early days of any interval combustion engine, the ageing results in the ignition timing having a zero shift. Therefore, during the start or idling of the engine having a speed of $N_1$ or less, the ignition timing is of a reference magnitude or a zero advance angle as shown at solid line a shown in FIG. 1. As the speed of the engine rises from its magnitude $N_1$, the ignition timing advances until the ignition timing reaches a maximum angle $\theta_1$ at the speed $N_2$ of the engine as shown by solid line a in FIG. 1. Thereafter, the ignition timing is held at the maximum angle $\theta$ as shown also by solid line a in FIG. 1 until the engine reaches a maximum speed.

However, the longer the service of the engine, the more ignition timing is shifted due to the ageing, as described above.

On the other hand, the machining accuracy of distributors and interval combustion engines may result in an initial shift of the ignition or the initial adjustment. This initial shift of the ignition timing has be generally corrected by adjusting the angular position of the distributor relative to a reference. To this end, a mounting for the distributor is designed and constructed so that it is rotatable. Such a construction is convenient for the official checkout of motor vehicles, whereas it may cause a danger that the ignition timing is intentionally put out of order. This has resulted in the deterioration of the exhaust gas emissions from interval combustion engines.

Various factors as described above have caused the ignition timing to be shifted as shown by dotted line b or c in FIG. 1. The shift $\theta_2$ of the ignition timing as shown in FIG. 1 is undesirable in view of measures to counter the exhaust gas emissions and it is necessary to correct the shift of the ignition timing according to some measure.

Figure 2:
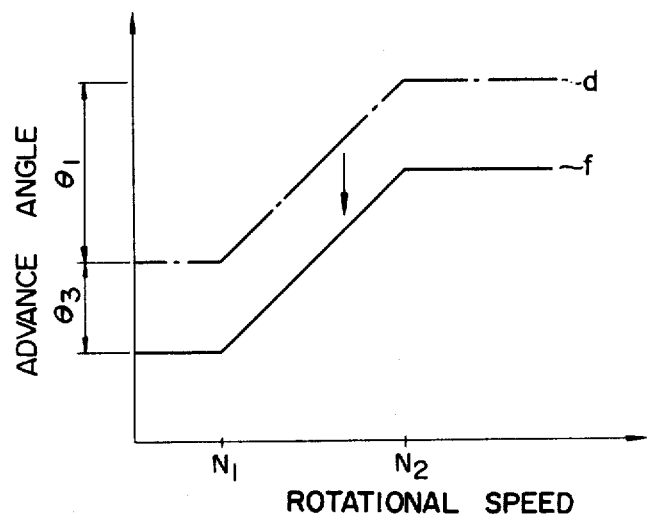
FIG. 2 is a graph similar to FIG. 1 and useful in explaining the fundamental principles of the present invention.

FIG. 2 shows the centrifugal advance characteristics useful in explaining the fundamental principles of the present invention. In FIG. 2, the axis of the ordinate represents an advance angle of the ignition timing of an associated internal combustion engine and the axis of the abscissa represents the rotational speed of the engine as in FIG. 1. Broken line d designates the advance characteristics of ignition timing signals obtained with an ignition generator disposed within an associated distributor and leading the desirable regular advance characteristic designated by solid line f by a constant angle $\theta_3$. Thus, by retarding the ignition timing signal by the constant angle $\theta_3$ over the entire speed range of an associated internal combustion engine, the advance characteristic d can result in the regular advance characteristic f.

More specifically, the present invention is arranged to generate from an ignition generator a pulsed ignition timing signal having a phase leading a regular phase by more than the width of variations in ignition timing, to sense a phase difference of the ignition timing signal relative to the regular phase, for example, during the idling of an associated interval combustion engine and store it in a suitable memory means. The width of variation in ignition timing corresponds to an initial shift or adjustment angle due to the machining accuracy of the interval combustion engine and an associated distributor and an varied angle due to ageing in the interval combustion engine. The stored phase difference is used to retard the ignition timing signal to the regular phase so as to thereby correct the ignition time.

Figure 3:
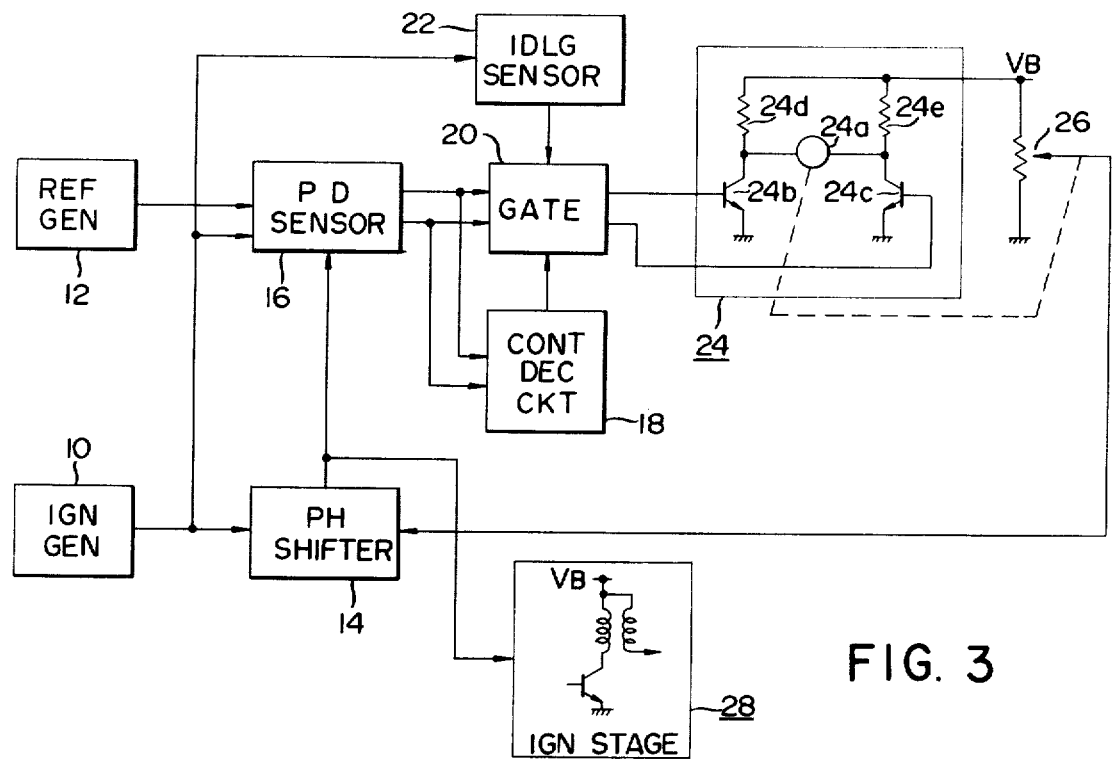
FIG. 3 is a block diagram of one embodiment according to the ignition time correcting signal system of the present invention used with interval combustion engines.

Referring now to FIG. 3, there is illustrated one embodiment according to the ignition timing correcting system of the present invention used with internal combustion engines. The illustrated arrangement comprises an ignition generator 10 disposed within an associated distributor (not shown), a reference generator 12 disposed on a crankshaft of an associated interval combustion engine, a phase shifter 14 connected to the ignition generator 10, and a phase difference sensor 16 connected to the ignition and reference generators 10 and 12 respectively and also to the phase shifter 14. The phase difference sensor 16 has a pair of outputs connected to both a control decision circuit 18 and a gate circuit 20 to which the control decision circuit 18 is connected. The ignition generator 10 is also connected to an idling sensor 22 which is subsequently connected to the gate circuit 20.

The gate circuit 20 is connected via a pair of outputs across a reversible electric driving device generally designated by the reference numeral 24. As shown in block 24, the driving device 24 includes a reversible electric motor 24a, a pair of common emitter NPN transistors 24b and 24c having respective base electrodes respectively connected to the pair of outputs of the gate circuit 20 and having respective collector electrodes connected across the reversible motor 24a. The collector electrodes of the transistors 24b and 24c are also connected via respective collector resistors 24d and 24e to a voltage point $V_B$ which is subsequently connected to ground through a variable resistor 26, in this case, a potentiometer 26. The potentiometer 26 has a movable tap controlled by the reversible motor 24a and connected to the phase shifter 14.

The phase shifter 14 is further connected to an ignition stage generally desginated by the reference numeral 28 and shown as including an ignition coil and a common emitter NPN transistor serving a switch connected to a primary winding of the ignition coil which is, in turn, connected to a voltage point $V_B$.

The arrangement of FIG. 3 is operated as follows: The ignition generator 10 generates a ignition timing signal having the advance characteristic (see broken line d, FIG. 2) dependent upon a parameter, for example, the rotational speed of the interval combustion engine. The ignition timing signal is applied to the phase shifter 14 where the phase thereof is retarded in accordance with an output voltage or a retardation control signal from the movable tap on the potentiometer 26 resulting a retarded ignition timing signal. The retarded ignition timing signal is applied to both the ignition stage 28 and the phase difference sensor 16. The ignition stage 28 is responsive to the retarded ignition timing signal to successively produce ignition voltages.

On the other hand, the reference generator 12 senses a reference angular position of the crankshaft to generate a pulsed reference timing signal at a predetermined angular position remaining unchanged with the speed of the interval combustion engine. Therefore, the reference timing signal is developed at a zero advance and serves as a reference for the correction of an ignition timing. The reference and retarded ignition timing signals are supplied to the phase difference sensor 16 which, in turn, senses the phase difference of the retarded ignition timing signals relative to the reference signal to produce an advance or a retardation correcting signal as the case may be, formed of a pulse train having a pulse width as determined by the phase relationship between the retarded ignition and reference timing signals. The phase difference between those two signals may be called hereinafter a correction angle which, in turn, corresponds to the pulse width of the pulse train. The advance or retardation correcting signal is respectively delivered to one or the other of the two outputs of the phase difference sensor 16.

Then, gate circuit 20 receives the advance or retardation correcting timing signal from the phase difference sensor 16 to control the passage of the correcting signal therethrough in the manner as will be described later. The retarded timing ignition and reference signals may have a minute phase difference therebetween which is enough to decrease the pulse width of the pulsed correcting signal from the phase difference sensor 16 so as to be smaller than a predetermined magnitude. Under these circumstances, the control decision circuit 18 is enabled so as to prevent the correcting signal from passing through the gate circuit 20 to thereby perform a locking function such that the control signal from the potentiometer 26 has a magnitude which remains unchanged or maintained constant.

The idling sensor 22 receives the pulsed ignition timing signal from the ignition generator 16 to sense or determine if the internal combustion engine is in the idling mode of operation. If so, the idling sensor 22 delivers an idling signal to the gate circuit 20 to permit the latter to pass the advance or retardation correcting signal therethrough. Otherwise, the gate circuit 20 is disabled from passing the correcting signal therethrough with the result that the control signal from the potentiometer 26 is locked so as to thereby remain unchanged.

Therefore, during the idling of the interval combustion engine as determined by the idling sensor 22, the gate circuit 20 delivers to the reversible driving device 24 an output signal or the advance or retardation correcting signal to turn the transistor 24b or 24c on as the case may be. This turn-on of the transistor 24b or 24c causes the reversible electric motor 24a to be driven forwardly or reversely as determined by the transistor 24b or 24c to move the movable tap along the potentiometer 26 toward one or the other of the ends thereof as the case may be. This controls the control signal from the potentiometer 26. The control signal from the potentiometer 26 is applied to the phase shifter 12. The phase shifter 12 responds to that control signal to retard the phase of the ignition timing signal so as to decrease the phase difference between the retarded ignition timing signal and the reference timing signal. By controlling the retardation provided by the phase shifter 12 in accordance with the phase relationship between the reference and retarded ignition timing signals through the closed loop control as described above, the phase of the retarded ignition timing signal is corrected to the reference position or the zero advance position during the idling of the internal combustion engine. In addition, the potentiometer 26 mechanically stores the control signal haing a magnitude giving a correction angle at that time and determines a corresponding retardation effected by the phase shifter 12.

Therefore, the phase shifter 12 produces the pulsed retarded ignition timing signal with the advance characteristic provided by correcting the advance characteristic of the distributor to the regular one. As a result, the retarded ignition timing signals have the advance characteristic as shown at solid line f in FIG. 2. The ignition stage 28 is responsive to that retarded ignition timing signals to interrupt the current flowing through the ignition coil, thereby resulting in ignition sparks having the regular ignition timing characteristic as shown at solid line f in FIG. 2.

Figure 4:
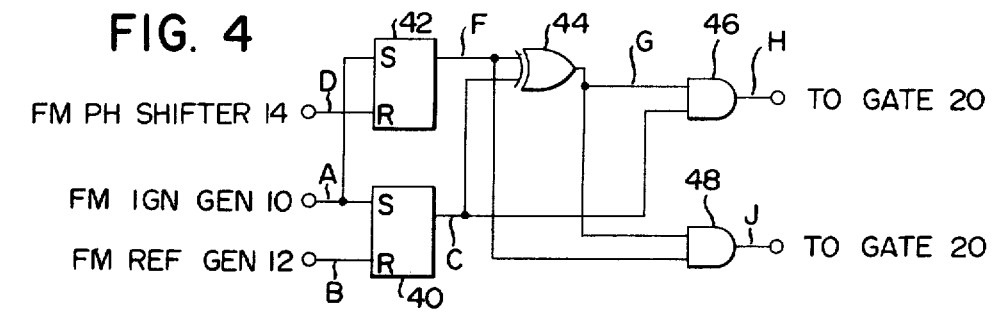
FIG. 4 is a circuit diagram of the details of the phase difference sensor shown in FIG. 3.

The phase difference sensor 16 is be preferably of a circuit configuration shown in FIG. 4. The arrangement comprises a FLIP-FLOP circuit 40 having its setting and a resetting inputs respectively connected to the ignition and reference generators 10 and 12 and another FLIP-FLOP circuit 42 having its setting input connected to that to the FLIP-FLOP circuit 40 and a resetting input connected to the phase shifter 14. The FLIP-FLOP circuits 40 and 42 have respective outputs connected to a pair of inputs of an exclusive OR gate 44 and also have their outputs respectively connected to an input of AND gates 48 and 46. The exclusive OR gate 44 has an output connected to other inputs of the AND gates 46 and 48. The AND gates 46 and 48 have respective outputs forming the pair of outputs of the phase difference sensor 16 shown in FIG. 3.

Figure 5:
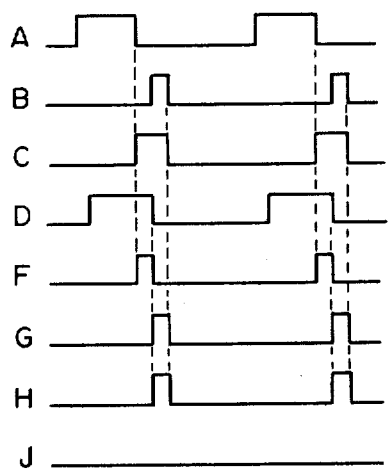
FIG. 5 is a graph illustrating waveforms developed at various points in the arrangement shown in FIG. 4 with a retarded ignition signal leading in phase a reference signal.
Figure 6:
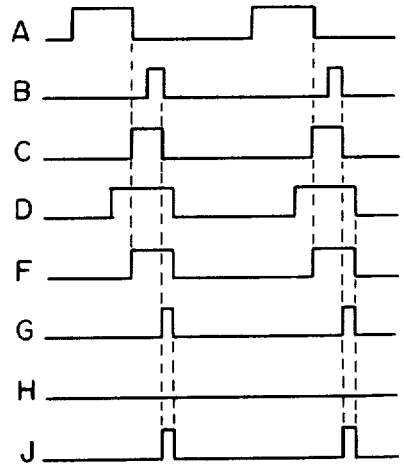
FIG. 6 is a graph similar to FIG. 5 but illustrating the retarded ignition signal lagging in phase the reference signal.

The operation of the arrangement shown in FIG. 4 will now be described in conjunction with FIG. 5, wherein there are illustrated waveforms developed at various points in the arrangement with the retarded ignition timing signal leading in phase the reference timing signal so as to require the retardation correction, and in conjunction with FIG. 6, wherein there are illustrated waveforms developed at the same points as those identified in FIG. 5 with retardation ignition timing signal lagging in phase the reference timing signal so as to require the advance correction. Also, the waveforms shown in FIGS. 5 and 6 are developed at associated points in the arrangement of FIG. 4 and are designated by like reference characterers identifying the waveforms. For example, waveform A is developed at a point A shown in FIG. 4 or the setting inputs to the FLIP-FLOP circuits 40 and 42. Also, signals are designated hereinafter by like reference characters identifying waveforms of those signals. For example, the retarded ignition timing signal is designated by the reference character D.

The FLIP-FLOP circuit 40 receives at its setting input the ignition timing signal A in the form of a pulse train as shown by waveform A in FIG. 5 or 6 and receives at its resetting input the reference timing signal in the form of a pulse train as shown by waveform B in FIG. 5 or 6. The FLIP-FLOP circuit 40 is triggered with a fall of each of pulses included in the two signals A and B to produce at its output or point C a train of rectangular pulses as shown by waveform C in FIG. 5 or 6. The rectangular pulse C has a pulse width equal to the difference in the phase angle between the falls of the adjacent reference and ignition timing signals as shown in FIG. 5 or 6.

On the other hand, the FLIP-FLOP circuit 42 receives at its setting input the reference timing signal A and receives at its resetting input the retarded ignition timing signal D resulting from the ignition timing signal retarded by the phase shifter 14. The FLIP-FLOP circuit 42 is similarly triggered with a fall of each of pulses included in the applied signals A and D to produce at its output or point F a train of rectangular pulses as shown by waveform F in FIG. 5 or 6. The rectangular pulse has a pulse width equal to the difference in the phase angle between the fall of the reference pulse and that of the adjacent retarded ignition pulse as shown in FIG. 5 or 6. The pulse or waveform F is equal in pulse width to the pulse or waveform C as long as the phase shifter 14 is sufficiently controlled.

The exclusive OR gate 44 is responsive to the two pulses or waveforms C and F to produce at its output G a train of rectangular pulses as shown by waveform G in FIG. 5 or 6. The rectangular pulses thus produced have a pulse width extending between the fall of the pulse or waveform G in FIG. 5 and that extending between the fall of the pulse or waveform F and that of the pulse or waveform C in FIG. 6. A pulsed signal G shown in each of FIGS. 5 and 6 form a pulsed signal having a pulse width corresponding to the required correction angle.

Then, the pulsed signal G is applied to both the AND gates 46 and 48 so that the AND gate 46 produces at its output or point H the logic product of waveforms G and C as shown by waveform H in FIG. 5 or 6 while the AND gate 48 produces at the output or a point J the logic product of waveforms G and F as shown by waveform J in FIG. 5 or 6.

When, as shown in FIG. 5, the retarded ignition timing signal D leads in phase the reference timing signal B so as to require a retardation correction, waveform H from the AND gate 46 is identical to pulses waveform G. At that time, no pulse is developed at the output or point J of the AND gate 48.

On the other hand, when, as shown in FIG. 6, the retarded ignition timing signal D lags the reference timing signal A so as to require an advance correction, waveform J from the AND gate 48 is identical to waveform G. However, a pulse is developed at the output or point H of the AND gate 46.

From the foregoing it is seen that a separate correcting signal is produced in accordance with the phase relationship required to be corrected and the signal has a pulse width proportional to the correction angle. The pulse width of the correcting signal can determine a control accuracy.

Figure 7:
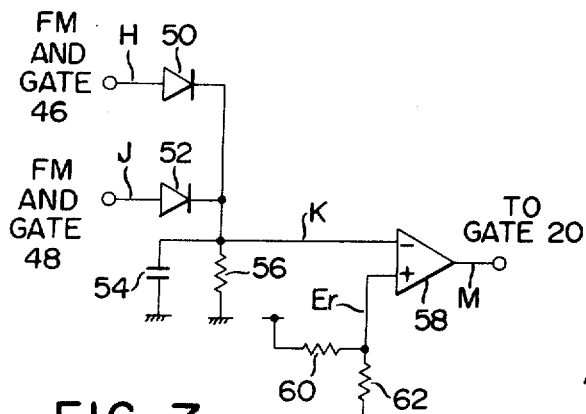
FIG. 7 is a circuit diagram of the details of the control decision circuit shown in FIG. 3.

As described above, the control decision circuit 18 is operative to determine or decide the control accuracy and preferably is of a circuit configuration as shown in FIG. 7. In the illustrated arrangement, a pair of semiconductor diodes 50 and 52 have respective anode electrodes respectively connected to the AND gates 46 and 48 (see FIG. 4) and respective cathode electrodes connected together to both a capacitor 54 and a discharging resistor 56 which are, in turn connected to ground. The cathode electrodes of the diodes 50 and 52 are connected to a negative input of a comparator 58 having its positive input connected to the junction of resistors 60 and 62 which are subsequently connected in series between a positive terminal of a voltage source and ground, although the voltage source is not shown only for purposes of illustration. Thus a positive bias $E_r$ is applied to the positive input of the comparator 38.

When the retarded ignition timing signal D leads the reference timing signal B, a pulsed signal H is developed at the output of the AND gate 46 as described above and then applied to the anode electrode of the diode 50 to charge the capacitor 54 through the diode 50. An electric charge accumulated on the capacitor 54 is arranged to discharge through the discharging resistor 56. A voltage K across the capacitor 54 increases with an increase in leading phae angle of the retarded ignition timing signal D relative to the reference timing signal B as shown by that portion of the charged voltage characteristic K of the capacitor 54 in the second quadrant labelled ADVANCE H of FIG. 8 wherein there is illustrated the charged voltage K across the capacitor plotted in the ordinate against a phase shift of the retarded ignition timing signal D relative to the reference timing signal B plotted in the abscissa.

This is true in the case where the retarded ignition timing signal lags the reference timing signal. More specifically, the pulsed signal J charges the capacitor 54 through the diode 52. The voltage K across the capacitor 54 increases with an increase in lagging phase angle of the retarded ignition timing signal D relative to the reference timing signal B as shown at that portion of the charged voltage characteristic K on a first quadrant labelled RETARD J of FIG. 8.

The voltage K across the capacitor 54 is developed on a lead labelled K and is applied to the negative input of the comparator 58 so as to be compared with the positive bias $E_r$ applied to the positive input thereof.

With the control effected sufficiently, waveform H shown in FIG. 5 or waveform J shown in FIG. 6 decreases in pulse width so that the voltage K across the capacitor 54 is lower than the bias $E_r$. As a result, an output M developed at the output M of the comparator 58 is put at its high level as shown on the lower portion of FIG. 8. The output or waveform M is shown in FIG. 8 as having a pulse width corresponding to the sum of the absolute value of the phase angle $-\theta$ of the retarded ignition timing signal shifted from the control reference or the origin O, that is, the intersection of the axis of the ordinate and the axis of the abscissas in the advance H side and that designated by $+\theta$ on the retard J side.

The control decision circuit 18 senses the completion of the control with the high level appearing in the output M and delivers the output M at a high level to the gate circuit 20 so as to prevent the latter from passing the advance or retardation correcting signal therethrough. As a result, the electric motor 24a is deenergized so as to stop the movement of the movable tap along the potentiometer 26. In other words, the control decision circuit 18 performs the locking function such that the control signal from the potentiometer 26 is prevented from changing in magnitude. Also, the potentiometer 26 mechanically stores and holds the control signal provided at that time by keeping the movable tap at its position occupied thereby upon the appearance of high level on the output M from the comparator 58. Therefore, the potentiometer 26 is prevented from changing in output.

Figure 8:
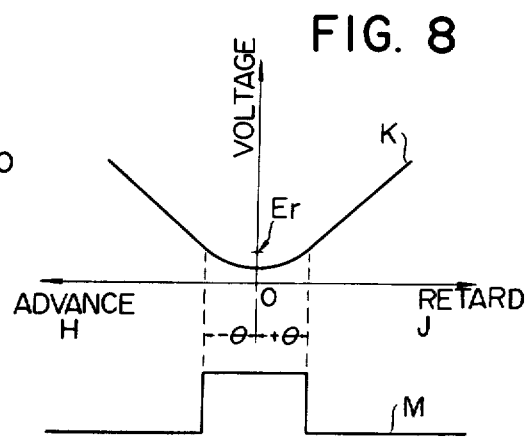
FIG. 8 is a graph illustrating the dynamic characteristics of the arrangement shown in FIG. 7.

In FIG. 8, it is seen that the voltage K across the capacitor 54 is not of a zero magnitude at the origin O for the following reasons: since the ignition timing signal has a pulse repetition period which is fluctuating due to irregular changes in speed of an associated internal combustion engine and the like, pulses are developed in the pulsed signals H and J even with the sufficient control. Therefore, the control results in the adjustment of the ignition timing within an angular range of from $-\theta$ to $+\theta$ about the origin O. It has been found that this angular range of from $-\theta$ to $+\theta$ provides a control accuracy satisfactory even for high output type internal combustion engines subsceptible to a change in ignition timing and therefore offers no problem.

From the foregoing it is seen that, the present invention is arranged to generate a reference timing signal at a reference angular position of the revolution of an associated internal combustion engine and a ignition timing signal having an advance characteristic preliminarily advanced by a predetermined phase angle with respect to the reference timing signal, to produce a retarded ignition timing signal by retarding the ignition timing signal and to control a retarded phase angle of the ignition timing signal during a predetermined operation or the idling of the internal combustion engine so as to cause the phase relationship between the retarded ignition and reference timing signals to coincide with a predetermined one to thereby correct the ignition timing to a regular timing while enabling the correction in the normal operation of the internal combustion engine by means of a control signal mechanically stored in a potentiometer. Therefore, the present invention eliminates the necessity of effecting the initial adjustment of the ignition timing previously required and also a shift of the ignition timing due to ageing changes in its components. Furthermore, the control signal stored in the potentiometer can be held even with the suspension of the internal combustion engine, resulting in the elimination of the correction effected each time the engine is again operated. In addition, the control signal can be controlled by the combination with a reversible electric motor, resulting in a simple construction eliminating the necessity of providing special circuits for writing and reading data as in digital memory devices.

While the present invention has been illustrated and described in conjunction with a single preferred embodiment thereof it is to be understood that numerous changes and modifications may be resorted to without departing from the spirit and scope of the present invention. For example, waveform G may be used in place of waveforms H and J as will readily be understood from the illustration of FIGS. 5 and 6.

What is claimed is:

1. An ignition time correcting system for an internal combustion engine comprising: a reference generator means for generating a reference timing signal at a reference angular position of the rotation of an internal combustion engine, an ignition generator means for generating an ignition timing signal at an angular position of the rotation of the engine leading that of said reference timing signal, said ignition timing signal having the advance characteristic corresponding to a parameter of the engine, a phase shifter means connected to said ignition generator means to control the retardation of said ignition timing signal in response to a control signal applied thereto, an ignition means connected to said phase shifter means to successively generate ignition voltages with a pulsed output from said phase shifter means, a variable resistor means for producing said control signal for determining the retardation of said pulsed ignition signal effected by said phase shifter means, and a control means connected to said reference generator means and said ignition generator means and said phase shifter means to drive and control said variable resistor means during a predetermined operation of the engine and in response to a phase of said pulsed output from said phase shifter means relative to said reference timing signal so as to put the phase relationship between said reference timing signal and said pulsed output from said phase shifter in a predetermined state.

2. An ignition time correcting system for an internal combustion engine comprising: a reference generator means for generating a reference timing signal at a reference angular position of the rotation of an internal combustion engine, an ignition generator means for generating an ignition timing signal at an angular position of the rotation of the engine leading that of said reference timing signal, said ignition timing signal having the advance characteristic corresponding to a parameter of the engine, a phase shifter means connected to said ignition generator means to control the retardation of said ignition timing signal in response to a control signal applied thereto, an ignition means connected to said phase shifter means to successively generate ignition voltages with a pulsed output from said phase shifter means, a variable resistor means for producing said control signal for determining the retardation of said pulsed ignition signal effected by said phase shifter means, and a control means connected to said reference generator means and said ignition generator means and said phase shifter means to drive and control said variable resistor means during a predetermined operation of the engine and in response to a phase of said pulsed output from said phase shifter means relative to said reference timing signal so as to put the phase relationship between said reference timing signal and said pulsed output from said phase shifter in a predetermined state;

wherein said control means includes a reversible electric motor which is forwaradly or reversely driven in response to whether said pulsed output from said phase shifter means is advanced or retarded.

3. An ignition time correcting system for an internal combustion engine comprising: a reference generator means for generating a reference timing signal at a reference angular position of the rotation of an internal combustion engine, an ignition generator means for generating an ignition timing signal at an angular position of the rotation of the engine leading that of said reference timing signal, said ignition timing signal having the advance characteristic corresponding to a parameter of the engine, a phase shifter means connected to said ignition generator means to control the retardation of said ignition timing signal in response to a control signal applied thereto, an ignition means connected to said phase shifter means to successively generate ignition voltages with a pulsed output from said phase shifter means, a variable resistor means for producing said control signal for determining the retardation of said pulsed ignition signal effected by said phase shifter means, and a control means connected to said reference generator means and said ignition generator means and said phase shifter means to drive and control of said variable resistor means during a predetermined operation the engine and in response to a phase of said pulsed output from said phase shifter means relative to said reference timing signal so as to put the phase relationship between said reference timing signal and said pulsed output from said phase shifter in a predetermined state;

wherein said control means includes means responsive to a phase difference between said reference timing signal and said pulsed output from said phase shifter which is not larger than a predetermined magnitude to stop the driving and controlling of said variable resistor means regardless of a change in said phase difference.

* * * * *